Jan. 10, 1961     E. P. AGHNIDES     2,967,580
COMPOSITE WHEEL
Filed June 26, 1956                                   2 Sheets-Sheet 1
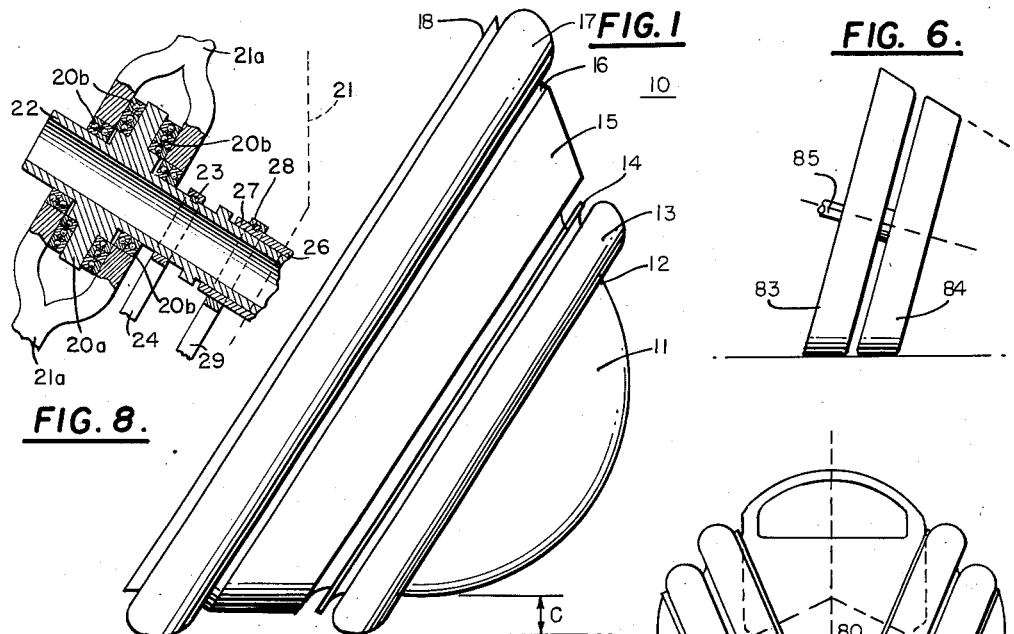
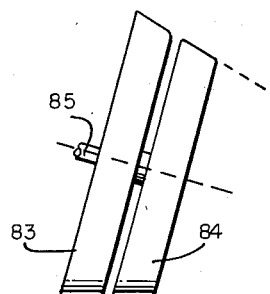
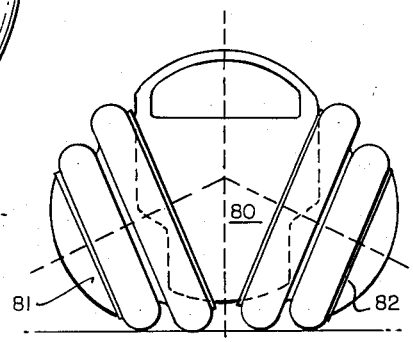
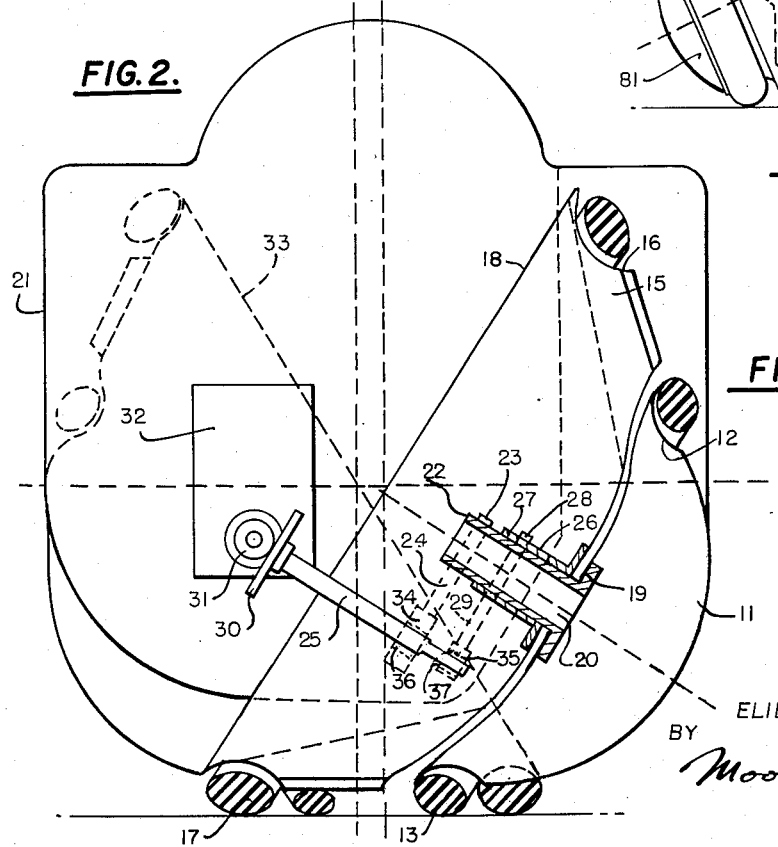
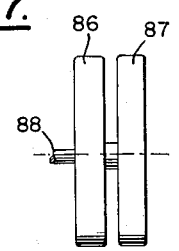
INVENTOR
ELIE P. AGHNIDES
BY
*Moore & Hall*
ATTORNEYS Jan. 10, 1961  E. P. AGHNIDES  2,967,580
COMPOSITE WHEEL Filed June 26, 1956  2 Sheets-Sheet 2

INVENTOR
ELIE P. AGHNIDES
BY Moore & Hall
ATTORNEYS

United States Patent Office 2,967,580
Patented Jan. 10, 1961

2,967,580

COMPOSITE WHEEL

Elie P. Aghnides, 46 W. 54th St., New York 19, N.Y.

Filed June 26, 1956, Ser. No. 593,959

4 Claims. (Cl. 180—22)

The present invention concerns hetero-axle dual and four-wheel vehicles, and in particular novel wheel structure therefor.

It is an object of the invention to provide a vehicle with two or more hetero-axial wheels, one or more on each side of the vehicle.

It is an object of the invention to provide a novel wheel structure for dual and four-wheeled vehicles having tilted hemispheroidal wheels.

It is an object of the invention to provide a hemispheroidal wheel structure having a novel control and providing the same linear speed along rolling surfaces of different diameter.

It is an object of the invention to provide a hemispheroidal wheel having independently driven tires of different diameters which operates smoothly without scuffing and undue wear and tear on the tire surfaces in contact with the ground.

It is an object of the invention to provide a dual tire hemispheroidal wheel in which power may be selectively supplied to one or both tires, or to neither tire, as desired.

It is an object of the invention to provide steering by independent braking or driving action of one or more tires of a composite wheeled vehicle.

The invention comprehends a vehicle with two or more wheels, preferably of overall hemispheroidal shape, each having two tires with separate drives off a main drive shaft. The two tires on each wheel are driven at the same linear or ground speed by a dual chain drive or its equivalent in which sprockets or gears of different diameter provide the requisite speed differential. There are two tire supports for each wheel mounted coaxially at an angle from the horizontal. The tires may be solid or pneumatic, as shown. The distance between the outer tires of opposite wheels is great enough to provide ample steering leverage by braking one wheel or supplying power to one wheel only, as desired.

Reference is made to the drawings, in which like numerals refer to like parts throughout.

Figure 1 is an elevation of a form of hetero-axial wheel according to the invention.

Figure 2 is a sectional view of the invention embodied in a vehicle as showing a schematic being reduced to the essentials of the wheel structure and mounting means therefor.

Figure 5 is a front view of a vehicle built according to the invention, showing another arrangement.

Figure 6 is a front elevation of a variation of a composite wheel structure of conical configuration.

Figure 7 is a further modification of a composite wheel.

Figure 8 is a detail view of the supporting and mounting means for the shaft of the wheel.

Figure 3:
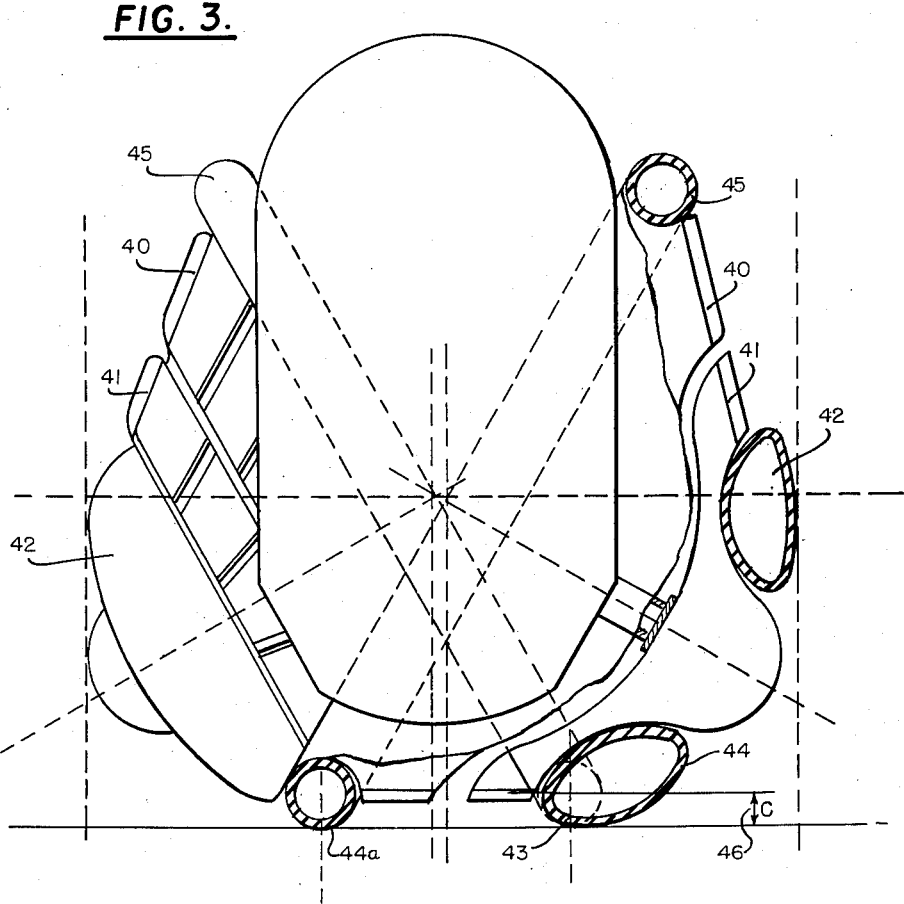
Figure 3 is a front elevation partly broken away and partly in section of one form of the invention.

The invention comprises a hetero-axial wheel structure mounted on a vehicle with drives and control therefor. A diagonally mounted hetero-axial wheel structure 10 is provided with an outer hemispheroidal member 11 having a groove 12 in which is disposed a tire 13. Tire 13 may be solid as shown in the drawing, or pneumatic as desired. Where the tire is made pneumatic, it is desirable that it be a self-sealing structure. The groove 12 defines a flaring lip 14 which overhangs and covers a frusto-conical mating housing 15 provided with a groove 16 in which is mounted a tire 17 which is similar to tire 13 except that it is of larger diameter. The groove 16 defines a flaring edge 18 in the frusto-conical housing 15. Outer hemispheroidal housing 11 is provided with a bearing means and mounting 19 which is centrally located with respect to housing 11 but disposed at an angle with the horizontal and mounted for rotation on a stub shaft 20 carried by the chassis of a vehicle 21. The bearing means and mounting 19 has a drive extension 22 supplied with a suitable sprocket 23 driven by a chain or the like 24. Chain 24 is driven by a drive shaft 25. Likewise mounted on stub shaft 20 and surrounding the bearing mounting means 19 is a second bearing mounting means 26 carrying the frusto-conical housing 15. Bearing mounting means 26 has an extension 27 on which is mounted a sprocket 28 driven by a chain or the like 29 which is in turn driven by the drive shaft 25. It will be noted that the sprocket 23 is of a smaller diameter than is sprocket 28 so that with a given drive speed of shaft 25, sprocket 23 and housing 11 will be driven at a higher r.p.m. than will sprocket 28 and housing 15. This speed differential is so chosen that the linear or ground speed of the tires 17 and 13 is the same. In this manner scuffing and undue wear and tear may be prevented.

The chains 24 and 29 are driven by the drive shaft 25 which is connected by suitable gearing 30 and 31 to an engine 32 within the body of the vehicle 21. As shown in dotted lines, a second wheel 33, the reverse in every respect of that just described, is mounted on the opposite side of the vehicle but in front of the wheel 10. The two tires 13 and 17 are spaced far enough apart to give ample lateral stability to the vehicle and the larger tires of each of the wheels are spaced far enough apart so that the vehicle may be steered by braking or driving one of these tires alone. It will be seen that the novel structure can provide great safety for the drive, as it is almost entirely enclosed in the body of vehicle 21, of which only the lower outer portion faces the terrain or road. This construction is permitted by the axial disposition of the stub shafts 20. It will be understood that the vehicle may, if desired, have four wheels 11 instead of just two, or more.

Figure 8 shows that the inner end of the drive extension 22 has an enlargement 20a which is supported by parts 21a of the vehicle body 21 by means of bearings 20b.

One of the features of the invention is the provision for driving the tires 13 and 17 either together or independently; and one means of accomplishing this is shown in Figure 2, in which the chains 24 and 29 run over sprocket wheels 34 and 35 respectively. Sprocket wheels 34 and 35 are preferably not of the same diameter and are mounted on the drive shaft 25 by means of suitable clutches 36 and 37 preferably of the type shown in U.S. Patents Nos. 2,575,360 and 2,718,157. The selective driving with independently and incrementally controlled clutches 36 and 37 of the type referred to makes it also possible to have complete and immediate control of the vehicle and to drive either or both tires of the front wheel while driving either or both tires of the rear wheel.

The structure of the two-wheeled vehicle shown in Figure 3, illustrates more clearly that both members of the composite wheel 10 may have radial ribs 40 and 41. The tire 42 of the outside wheel member has a special shape which continues hemispheroidally from the point of contact with the ground at 43 towards the point 44, providing two advantages. First, it becomes possible to space point 43 and point 44a, the point of contact of the inner tire 45, farther apart, thus providing greater stability. Second, it will be noted that as the vehicle rolls about its longitudinal horizontal axis so that the point of contact 43 shifts toward the point 44, the distance 46 decreases gradually.

Figure 4:
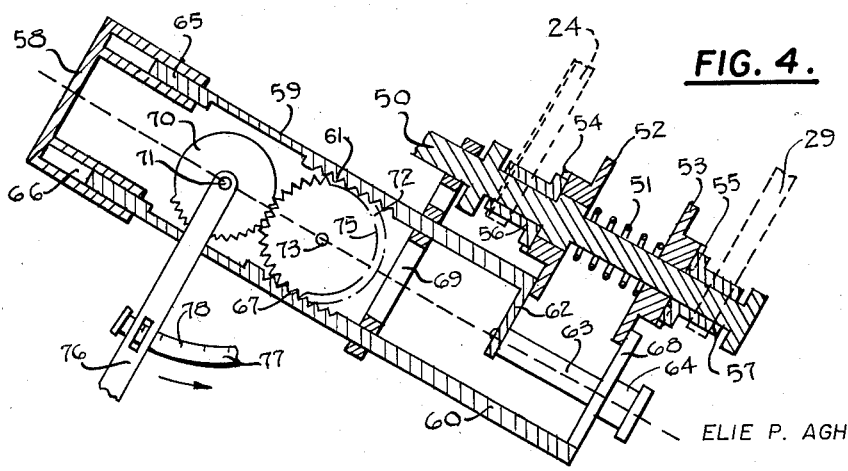
Figure 4 is a detail, partly in section, of one form of drive and control for the composite wheel structure for selective driving.

One form of drive for selective operation of the composite wheels is shown in Figure 4, by which chains 24 and 29 may be driven independently, or at a selected differential speed. Drive shaft 50, corresponding to drive shaft 25 of Figure 2, mounts and drives chains 24 and 29. Drive shaft 50 is suitably mounted on bearings in the vehicle frame. In the position shown in Figure 4, spring 51 pushes discs 52 and 53 so that grooves 54 and 55 receive corresponding ribs in tubes 56 and 57. The power from the engine is transmitted by shaft 50 through discs 52 and 53 which are keyed to shaft 50 by suitable splines or feather keys, mating ribs and grooves 54, 55 and tubes 56, 57 to chains 24 and 29, both of which are operated by the shaft 50.

A guide member 58 carried by the vehicle frame supports two movable plates 59 and 60. Plate 59 is provided with a rack portion 61, a shoulder 62 bearing against disc 52, and terminates in a slide rod 63 supported at 64 by plate 60. Plate 59 is slidable in a guideway indicated at 65, and plate 60 is slidable in a guideway 66, both of which are in member 58.

Plate 60 has a rack 67 and an arm 68 on one end thereof which carries support 64 and bears against disc 53. Additional guide means 69 is provided to support plates 59 and 60 for reciprocating movement. A gear means 70 is pivoted on the vehicle frame at 71 and engages a second gear 72, likewise pivoted at 73. Gears 70 and 72 are in engagement, but gear 72 is provided with teeth which extend only part way around its periphery, about half the gear being without teeth as at 75. A control lever 76 is fastened to and turns with gear 70 and may be provided with a suitable indicating dial 77 with event position marks 78 thereon to indicate in what manner the apparatus of Figure 4 is operating.

In the position of lever 76 shown in Figure 4, both members of the composite wheel receive power as both chains 24 and 29 are driven by the shaft 50. When lever 76 is rotated counter-clockwise to the next operating position, it rotates gear 72 in a clockwise direction and as the gear teeth are meshed with rack 67, plate 60 is moved to the left. As plate 60 moves to the left, arm 68 acts against the edge of disc 53 to move it out of engagement with tube 57, the mating rib and groove at 55 being disengaged and spring 51 compressed. The disengagement of rib and groove 55 deactivates chain 29 and the outer part of the composite wheel structure. The rib and groove combination 54 remains in driving relation because the plain part 75 of gear 72 is opposite rack 61 and plate 59 is not moved. The inner member of the composite wheel continues to receive driving power through chain 24.

When lever 76 is moved farther counter-clockwise to the next position, the teeth of gear 72 engage both racks 61 and 67 and both tubes 56 and 57 have their rib-groove members 54 and 55 disengaged. For this position of lever 76 no power is supplied by shaft 50 to either of the chains 24 and 29.

When lever 76 is rotated to the farthest counterclockwise position, the plain part 75 of gear 72 is positioned opposite rack 67, thus releasing plate 60 and allowing spring 51 to force disc 53 to the right and engage the rib-groove combination 55. This action causes shaft 50 to drive chain 29 and the outer portion of the corresponding composite wheel. As the toothed part of gear 72 holds plate 59 in the righthand position with rib-groove combination 54 disengaged, the chain 24 is not driven.

Figure 5 shows a vehicle chassis 80 having an arrangement of angularly mounted composite wheels 81 and 82 in side-by-side relation and enclosing much of the body structure. It will be seen that the structure is symmetrical and highly stable. Little of the body 80 is exposed in a lateral direction.

Figure 6 shows conical wheels 83 and 84 arranged for angular mounting on shaft 85. It will be understood that they may be provided with the selective drive discussed in connection with Figure 4 and a dual shaft as shown in Figure 2.

Figure 7 shows a further modification in which the wheels 86 and 87 are cylindrical and mounted on shaft 88 which may also be a dual shaft as shown in Figure 2 and controlled as shown in Figure 4.

This application is a continuation in part of my prior copending application S.N. 593,853, filed June 26, 1956 entitled Hetero-Axle Vehicle.

I claim:

1. A body having a vehicle structure and a load-carrying rolling ground-contacting wheel disposed on one side of the vehicle, a second wheel on the other side of the vehicle; said structure including means maintaining the first wheel with its axis pointing normally outwardly and downwardly, said first wheel comprising a ring-shaped rolling element and also including an extended rolling surface element adjacent the said ring-shaped rolling element and extending away from the outer part of said ring shaped rolling element with a generally decreasing diameter measured in planes perpendicular to the axis of rotation and which will provide a stable vehicle and on sinkage of the vehicle will contact the ground and limit the sinkage, said ring-shaped rolling element and said extended rolling surface element normally contacting the ground and being separate whereby they may rotate at different speeds, and means for rotating at least one of said elements.

2. A vehicle as defined in claim 1 said last-named means including means for rotating the other one of said elements and for driving said extended rolling surface element at a higher angular velocity than said ring-shaped rolling element, whereby the two elements have the same linear ground speed.

3. A vehicle comprising a vehicle structure, two traction and load-carrying wheel means disposed respectively on opposite sides thereof, each wheel means including two wheel sections one of which is farther outward from the vehicle structure and is of smaller diameter than the other one, power means for supplying torque to each wheel means and for mounting the two sections of each wheel means about an axis inclined outwardly and downwardly so that each wheel section contacts the ground, said power means including driving means rotatable about said axis and connected to the wheel sections for rotating the latter about their respective axes with each outer section being rotated at an angular velocity sufficiently higher than that of its complementary inner section so that the peripheral speeds of the ground contacting surfaces of the two complementary sections are the same, and engine means for applying torque to said driving means thereby to rotate the wheel-means, each said wheel-means having a rolling ground-contacting surface of generally decreasing wheel diameter as the distance from the vehicle structure increases.

4. A wheeled vehicle having a composite wheel with inner and outer round spaced members that normally contact the ground, means mounting said members for independent rotation, the outer of said members being hemispheroidal, said two members being of different diameter, and means to drive said two members at the same linear ground speed.

References Cited in the file of this patent

UNITED STATES PATENTS

| | | |
|---|---|---|
| 1,190,537 | Fry | July 11, 1916 |
| 1,225,181 | Schleicher | May 8, 1917 |
| 2,096,239 | Geyer | Oct. 19, 1937 |
| 2,126,960 | Higbee | Aug. 16, 1938 |
| 2,330,958 | Danforth | Oct. 5, 1943 |
| 2,372,043 | Aghnides | Mar. 20, 1945 |
| 2,432,107 | Williams | Dec. 9, 1947 |
| 2,448,222 | Jones | Aug. 31, 1948 |
| 2,698,566 | Stough | Jan. 4, 1955 |
| 2,727,582 | Lisenby | Dec. 20, 1955 |
| 2,812,031 | Aghnides | Nov. 5, 1957 |

FOREIGN PATENTS

| | | |
|---|---|---|
| 588,059 | France | Jan. 26, 1925 |
| 172,105 | Switzerland | Jan. 2, 1935 |